March 15, 1966  R. S. JONES  3,240,472
WHEEL ALIGNMENT TOOL
Filed Jan. 22, 1964  2 Sheets-Sheet 1

INVENTOR
RALPH S. JONES
BY
ATTORNEY

March 15, 1966  R. S. JONES  3,240,472
WHEEL ALIGNMENT TOOL
Filed Jan. 22, 1964  2 Sheets-Sheet 2
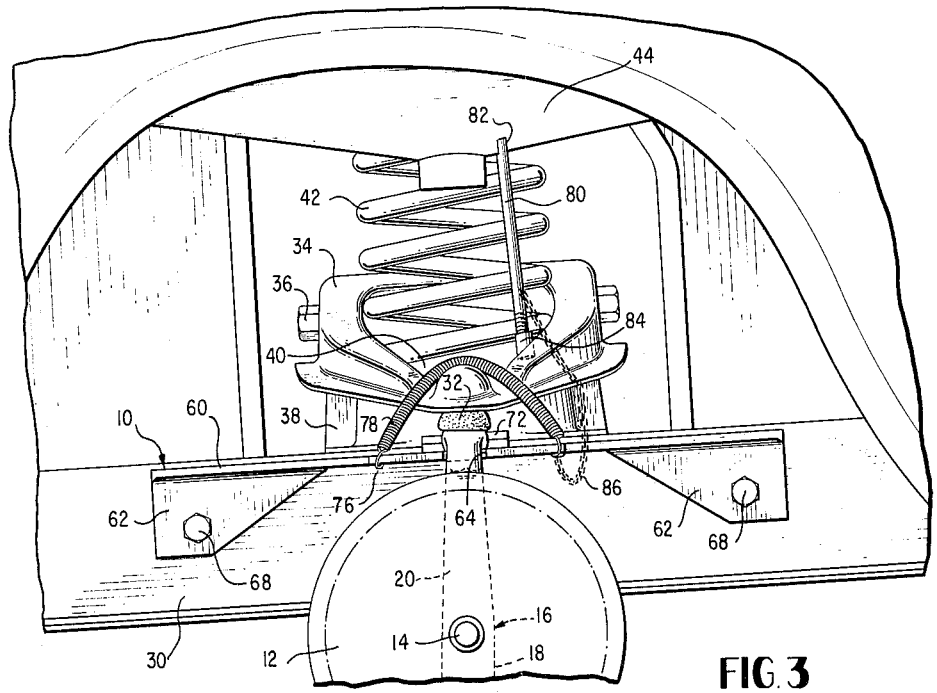
FIG. 3
FIG. 4
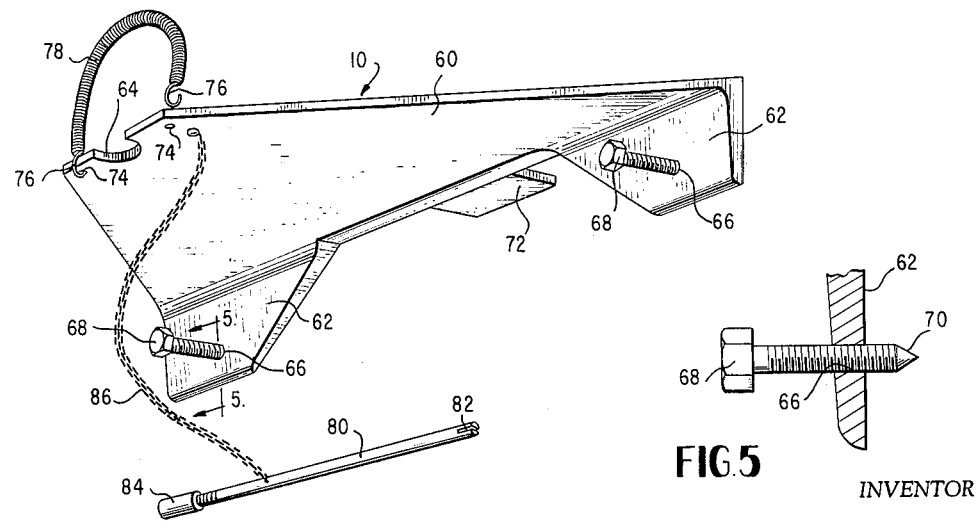
FIG. 5
INVENTOR
RALPH S. JONES
BY *Mirie E. Finley*
ATTORNEY

United States Patent Office 3,240,472
Patented Mar. 15, 1966

3,240,472
WHEEL ALIGNMENT TOOL
Ralph Simmons Jones, 1385 Gordon Road SW.,
Atlanta 10, Ga.
Filed Jan. 22, 1964, Ser. No. 339,493
7 Claims. (Cl. 254—100)

This invention relates to a wheel alignment tool for adjusting the front suspension arrangement of a motor vehicle, and more particularly to a tool for obtaining an infinitely fine caster and camber adjustment of an independent suspension system.

The wheel alignment tools heretofore used for adjusting the caster and camber of certain types of independent front wheel suspensions have not been efficient and satisfactory because they are difficult to apply and/or operate, are not rigidly disposed in position, are incapable of obtaining accurate and fine adjustments and/or require removal of the front wheel. Such tools require extra time and labor by the mechanic and increased costs to the customer.

Having in mind the defects of the prior art tools, it is the principal object of the present invention to provide a wheel alignment tool capable of obtaining infinitely fine caster and camber adjustments of certain types of independent suspension systems.

It is another object of the invention to provide a tool of the foregoing type that is easy to install without removal of the wheel, and is rigidly disposed in operative position whereby to obtain accurate adjustment.

It is a further object of the invention to provide a tool as aforesaid having simplicity of design, economy of construction and efficiency in operation.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIG. 3 is a side view in elevation of FIGS. 1 and 2;

FIG. 4 is a view in perspective of a wheel alignment tool according to the invention, and FIG. 5 is a fragmentary cross-sectional view taken on line —5 of FIG. 4.

Figure 1:
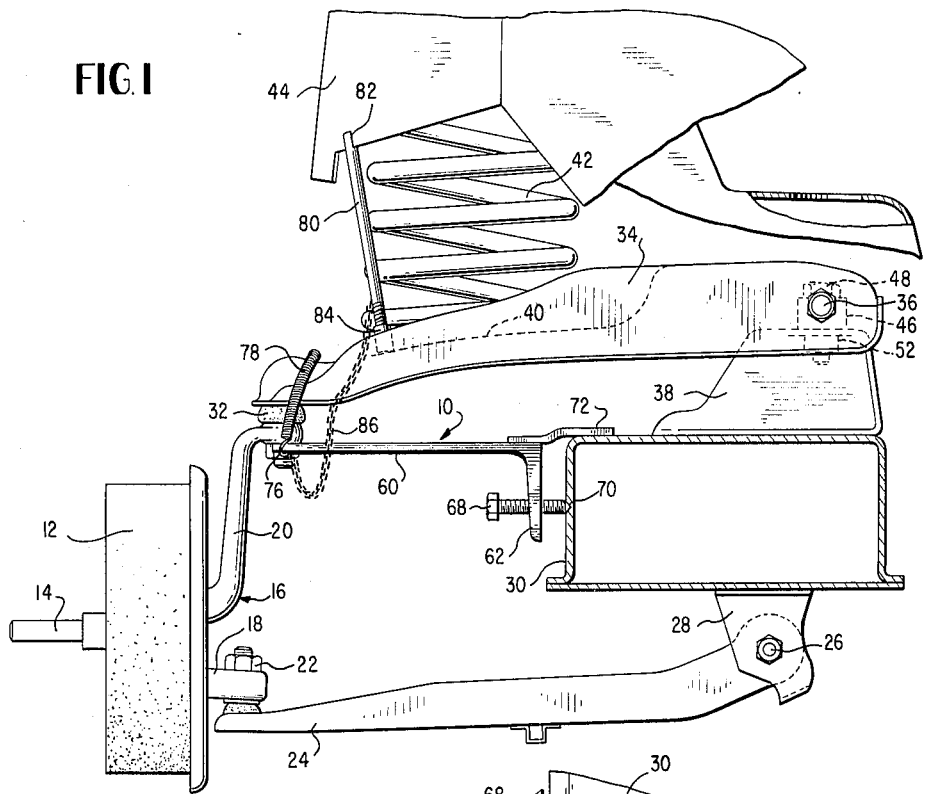
FIG. 1 is a view in elevation of the front of a standard type of an independent suspension system and showing a wheel alignment tool in accordance with the present invention in operative position.
Figure 2:
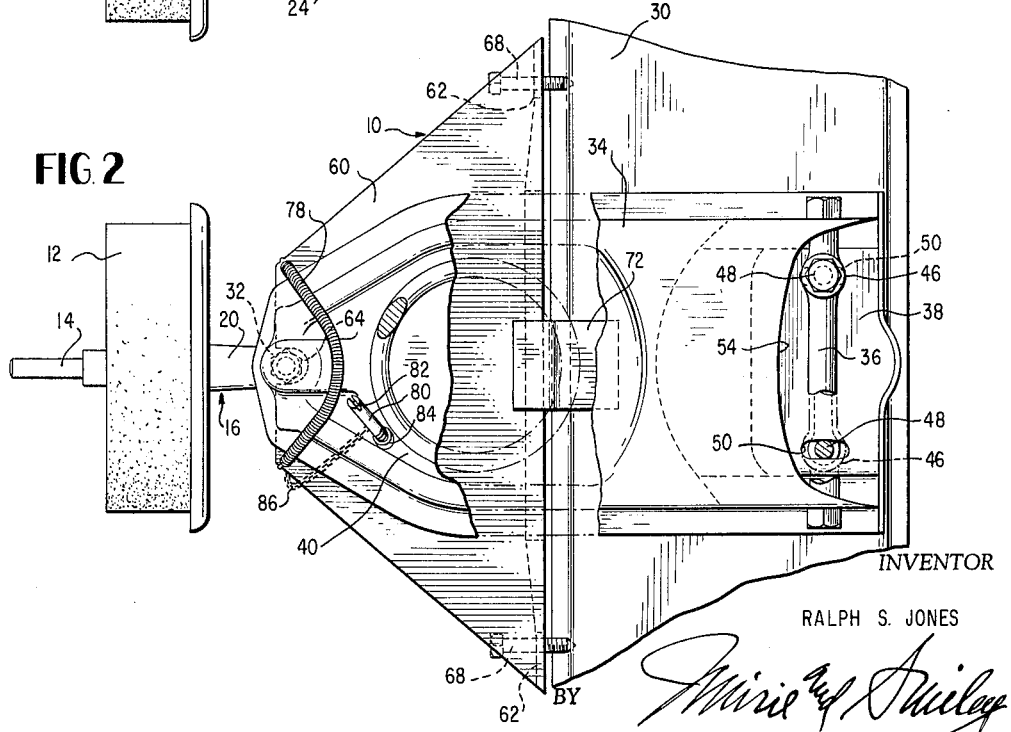
FIG. 2 is a plan view of FIG. 1.

Referring now to the drawings, specifically to FIGS. 1–3, a wheel alignment tool 10, in accordance with the present invention, is shown in operative position with respect to one well-known type of independent front suspension system. The suspension system is more particularly disclosed in Patent No. 3,033,588 granted May 8, 1962 to G. H. Muller et al., but a brief description thereof is first given hereinafter to better understand the environment for use of the tool 10.

The wheel hub 12 (the wheel being omitted for better illustration) is journaled in the usual manner on the spindle 14 of a spindle support 16 including lower and upper support arms 18 and 20, respectively. The lower support arm 18 is connected by a ball joint assembly 22 with a lower suspension arm 24 that is pivotally mounted on its inner end on shaft means 26 disposed on an axis extending longitudinally of the vehicle. The shaft means 26 is carried by a bracket 28 that is shown as depending from the vehicle frame side rail 30, but the bracket may be mounted on a frame cross member.

The upper support arm 20 is connected by an upper ball joint assembly 32 with an upper suspension arm 34 that is pivotally mounted at its inner end on a shaft 36 extending longitudinally of the vehicle frame and carried by a support bracket 38 secured on the frame side rail 30. The outer end portion of the upper suspension arm 34 is dished to form a spring pan 40 which supports a coil spring 42 which in turn supports an upper spring seat 44 on the vehicle body.

The pivot shaft 36 is adjustably mounted on the bracket 38 to enable adjustment of the caster and camber of the wheel hub 12. For this purpose, the shaft 36 is provided with two spaced hublike portions 46 having vertically disposed bores for receiving lock bolts 48. The upper wall of the bracket 38 is provided with two elongated apertures or slots 50 through which the bolts 48 pass, and the bolts are secured in threaded apertures in a locking plate 52 beneath the bracket wall. The inner end portion of the upper wall of the suspension arm 34 has a recess 54 giving access to the bolts 48.

The wheel alignment tool 10 according to the present invention, as best shown in FIG. 4, comprises an elongated rigid platelike body 60 with flange means 62 disposed perpendicularly along the inner or base edge thereof. The opposite outer edge of the body plate 60 is provided with a semicircular saddle or notch 64. The flange means 62 is provided with two spaced, internally threaded apertures 66 in which are threaded cap screws 68 having hardened, pointed inner ends 70, FIG. 5. To conserve material and reduce weight, the plate body 60 preferably is in the configuration of a truncated triangle, and the flange means 62 comprises coplanar spaced flange portions adjacent the end portions of the body.

A rigid tongue 72 is fixed to the body 60 and projects beyond the base edge medially thereof. The plate body 60 is provided with a pair of apertures 74 adjacent the outer edge and on opposite sides of the saddle or notch 64 to receive hooks 76, or similar connecting means, on the ends of a flexible elongate hanger 78, preferably a coil spring. One of the connectors 76 may be fixed to secure the hanger 78 to the body 60, but one connector 76 must be adapted to be removably connected in its aperture 74. A prop 80 comprising a rod having a slot 82 in one end and a cap nut 84 threaded on the other end is secured to the body 60 by a tether 86, such as a chain.

To adjust the caster and camber of the previously described suspension system, it is necessary to adjust the pivot shaft 36 on the bracket 38 and retain it rigidly in position until the lock bolts 48 are securely tightened. The present wheel alignment tool 10 is specifically adapted for this purpose, as best shown in FIGS. 1–3. In operation, the tool 10 is inserted between the upper ball joint assembly 32 and the frame side rail 30 with the saddle or notch 64 nesting the depending shank of the joint 32 and the pointed inner ends 70 of the cap screws 68 abutting the side rail 30. The cap screws 68 are struck sharply with a hammer to embed their pointed ends 70 in the side rail 30 to hold the tool in position.

To secure the tool in position, the tongue 72 is rested on the top of the side rail 30, and the spring 78 is trained over the connection of the ball joint 32 with the end of the upper suspension arm 34 to form a hanger. Any flexible hanger element may be employed, but the spring 78 is preferred because it accommodates variations in dimensions and resiliently draws the plate body 60 up against the joint assembly. The prop rod 80 is positioned with its slot 82 receiving the lip of the upper spring seat 44 and with its nut 84 seated in the front of the spring pan 40 to hold the front end at the proper height while the caster and camber are adjusted.

When the tool 10 is positioned, the lock bolts 48 are loosened so that the pivot shaft 36 may be adjusted. If the camber is too high, the cap screws 68 are loosened and the pivot shaft 36 is moved inwardly until the camber is on the low side. The caster is then set by loosening one cap screw 68 and tightening the other screw 68 correspondingly. To set positive caster, the front screw 68 is tightened and the rear screw loosened, and for negative caster the operation is reversed. After the caster is set, the positive camber is then adjusted by threading both screws 68 inward at equal tension, alternating about two turns each. When the camber is set, the lock bolts 48 are then tightened securely to hold the pivot shaft 36 in adjusted position.

Although a certain specific embodiment of the invention has been shown and described, it is obvious that many modifications thereof are possible. The invention, therefore, is not to be restricted except insofar as is necessitated by the prior art and by the spirit of the appended claims.

That which is claimed is:

1. A wheel alignment tool comprising an elongate platelike body having at one edge a notchlike saddle for straddling a ball joint assembly of an independent suspension system, perpendicularly disposed flange means depending from the opposite edge of said body, said flange means having a spaced pair of threaded apertures therein, and cap screws threaded through said apertures for abutment against a vehicle frame side rail to selectively position said saddle and ball joint assembly straddled thereby.

2. A tool according to claim 1 wherein said cap screws have hardened, pointed free ends for embedding in the frame side rail to prevent slippage.

3. A tool according to claim 2 comprising a rigid tongue fixed to said body and extending beyond said flanged edge for resting on top of the frame side rail.

4. A tool according to claim 3 comprising an elongate flexible hanger attached at one end to said body on one side of said saddle and having at the other end means for releasable connection to said body on the other side of said saddle, said hanger being adapted to be trained over the ball joint assembly to retain said saddle in operative position.

5. A tool according to claim 4 wherein said hanger comprises a coil spring for resiliently drawing said saddle up against the ball joint assembly.

6. A tool according to claim 5 wherein said body has the configuration of a truncated triangle with said saddle at the truncated edge thereof, and said flange means comprises coplanar flange portions at the opposite ends of said body with each of said flange portions having one of said threaded apertures.

7. A tool according to claim 6 comprising an adjustable prop including a rod having a slot at one end and a nut threaded on the other end, and a tether connecting said prop to said body.

No references cited.

WILLIAM FELDMAN, *Primary Examiner.*